United States Patent
Lake (10) Patent No.: US 10,558,556 B2
(45) Date of Patent: Feb. 11, 2020

(54) INTROSPECTIVE FAULT AND WORKLOAD INJECTION FOR SERVICE ASSURANCE

(71) Applicant: Cisco Technology, Inc., San Jose, CA (US)

(72) Inventor: John M. Lake, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 15/816,583

(22) Filed: Nov. 17, 2017

(65) Prior Publication Data
US 2018/0365135 A1 Dec. 20, 2018

Related U.S. Application Data

(60) Provisional application No. 62/521,995, filed on Jun. 19, 2017.

(51) Int. Cl.
*G06F 11/36* (2006.01)
*G06F 11/30* (2006.01)

(52) U.S. Cl.
CPC ........ *G06F 11/3676* (2013.01); *G06F 11/302* (2013.01); *G06F 11/3688* (2013.01)

(58) Field of Classification Search
CPC .... G06F 11/261; G06F 11/263; G06F 11/302; G06F 11/3409; G06F 11/3414; G06F 11/47; G06F 11/3466; G06F 11/366; G06F 11/3668; G06F 11/3672; G06F 11/3676; G06F 2201/865; G06F 11/3688; G06F 11/3692; G06F 11/3696; G05B 23/0256
See application file for complete search history.

(56) References Cited

U.S. PATENT DOCUMENTS

| | | | | |
|---|---|---|---|---|
| 5,991,215 A | * | 11/1999 | Brunelle | G11C 29/88 365/201 |
| 6,195,415 B1 | * | 2/2001 | Shimoda | H04M 3/323 379/22 |
| 6,378,088 B1 | * | 4/2002 | Mongan | G06F 11/3684 703/22 |
| 7,933,213 B1 | * | 4/2011 | Croak | H04L 43/024 370/242 |
| 2010/0275057 A1 | * | 10/2010 | Durica | G06F 11/2094 714/6.32 |
| 2011/0054643 A1 | * | 3/2011 | Law | G06F 11/3636 700/79 |
| 2011/0161506 A1 | * | 6/2011 | Dickerson | H04L 63/083 709/228 |
| 2014/0297842 A1 | * | 10/2014 | Yoshimoto | G06F 3/0625 709/224 |
| 2016/0026481 A1 | * | 1/2016 | Gordon | G06F 9/44526 717/174 |

* cited by examiner

*Primary Examiner* — Gabriel Chu
(74) *Attorney, Agent, or Firm* — Patterson + Sheridan, LLP (57) ABSTRACT

Systems, methods, and computer program products to perform an operation comprising determining, based on actual coverage point data for a first time interval and expected coverage point data, that a first set of lines of source code associated with the actual and expected coverage point data have not been executed by a system, instantiating, in the system, an action code associated with the first set of lines of source code and an effect code associated with the action code, and determining, based on a final state of the effect code, whether the action code executed correctly in the system.

20 Claims, 5 Drawing Sheets

FIG. 5

INTROSPECTIVE FAULT AND WORKLOAD INJECTION FOR SERVICE ASSURANCE

CROSS-REFERENCE TO RELATED APPLICATIONS

This application claims benefit to provisional application 62/521,995, filed Jun. 19, 2017. The aforementioned patent application is herein incorporated by reference in its entirety.

TECHNICAL FIELD

Embodiments presented in this disclosure generally relate to testing computing systems. More specifically, embodiments disclosed herein relate to introspective fault and workload injection for service assurance.

BACKGROUND

Conventionally, testing of a computing or networking system that includes a fault tolerance strategy for availability includes injection of a failure into the system. For example, to ensure the system responds appropriately to a process failure, a perfectly healthy process is halted, the system's response is observed, and the results are recorded for further use. However, conventional approaches have not been extended to test all system components at all times. Instead, conventional approaches focus on testing specific system components at specific times. As such, system errors may go undetected for long periods of time, having a negative impact on overall system availability. These consequences are exacerbated in systems in production, where system reliability and availability cannot be compromised.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

In one embodiment presented in this disclosure, a method comprises determining, based on actual coverage point data for a first time interval and expected coverage point data, that a first set of lines of source code associated with the actual and expected coverage point data have not been executed by a system, instantiating, in the system, an action code associated with the first set of lines of source code and an effect code associated with the action code, and determining, based on a final state of the effect code, whether the action code executed correctly in the system.

In another embodiment, a system comprises a processor and a memory containing a program. The program is executable by the processor to perform an operation comprising determining, based on actual coverage point data for a first time interval and expected coverage point data, that a first set of lines of source code associated with the actual and expected coverage point data have not been executed by the system, instantiating, in the system, an action code associated with the first set of lines of source code and an effect code associated with the action code, and determining, based on a final state of the effect code, whether the action code executed correctly in the system.

In another embodiment, a non-transitory computer-readable storage medium has computer-readable program code embodied therewith, the computer-readable program code executable by a processor to perform an operation comprising determining, based on actual coverage point data for a first time interval and expected coverage point data, that a first set of lines of source code associated with the actual and expected coverage point data have not been executed by a system, instantiating, in the system, an action code associated with the first set of lines of source code and an effect code associated with the action code, and determining, based on a final state of the effect code, whether the action code executed correctly in the system.

Example Embodiments

Embodiments disclosed herein provide fault tolerance strategies which ensure that production state systems are always in a state where responses to faults are handled properly and without substantial or unexpected negative consequences on existing production workloads. The fault tolerance strategies further ensure that system functions that may be idle for some period of time are nonetheless ready to receive work. Doing so enhances availability of production state systems by accelerating detection of developing problems in the system and enabling a lower time to repair the system.

Generally, embodiments disclosed herein ensure that production state systems are always ready to perform all types of functional and/or administrative activities by testing the system constantly and reporting the results of the tests. The system testing is performed with an awareness of overall system state, local element state (e.g., one or more nodes of a multi-node system), and production workload state so that the reliability of the system is not compromised while handling naturally occurring faults and workloads. For example, if a first portion of source code is executed during normal operation of the system, embodiments disclosed herein may refrain from testing the first portion of source code for a predefined duration of time. Doing so diminishes the burden on system resources used to test the system. However, if a second portion of source code has not been executed during normal operation of the system, embodiments disclosed herein may inject a fault or workload known to exercise the second portion of source code to ensure that the second portion of source code is executing correctly. Doing so provides an indication of the health and/or readiness of the second portion of source code.

Figure 1:
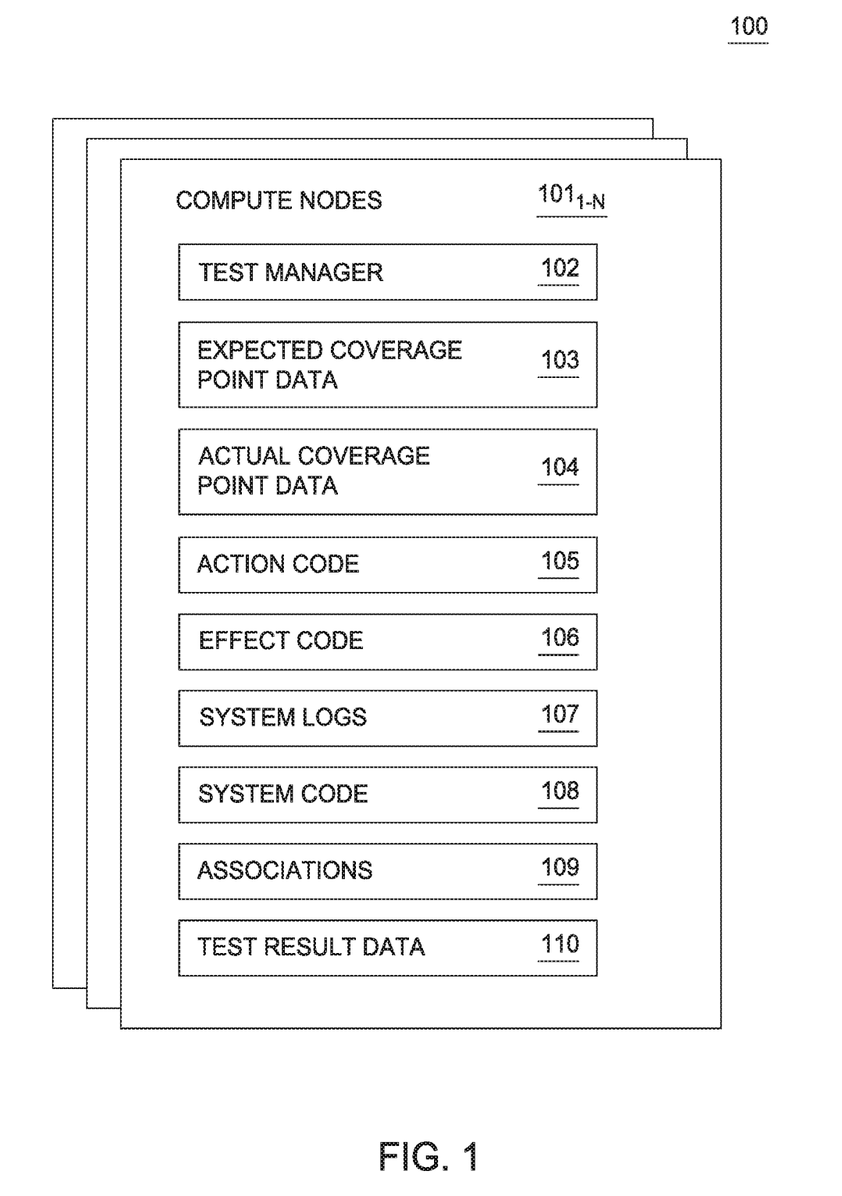
FIG. 1 illustrates an example computing environment which provides introspective fault and workload injection for service assurance, according to one embodiment.

FIG. 1 illustrates an example computing system 100 which provides introspective fault and workload injection for service assurance, according to one embodiment. As shown, the computing system 100 includes one or more compute nodes $101_{1-N}$. The compute nodes $101_{1-N}$ are representative of any type of single or multi-node computing system, including without limitation servers, networking devices (e.g., routers, switches, etc.), and the like. The computing system 100 is in a "production state," in that the compute nodes $101_{1-N}$ have been deployed to provide computing functions and/or services. For example, the compute nodes $101_{1-N}$ may be part of an online shopping platform, business enterprise platforms, and the like, where reliability and availability of the relevant functions and services must be guaranteed at nearly all times.

As shown, each compute node $101_{1-N}$ includes a test manager 102, which is configured to orchestrate testing of the system code 108 of the respective compute node $101_{1-N}$, as well as one or more of the other compute nodes $101_{1-N}$ in the system 100. The system code 108 is representative of any type of executable code. For example, and without limitation, the system code 108 is representative of functional code (e.g., workloads, services, instructions, modules, functions) and administrative code (e.g., code to perform software upgrades, forensic data collection, etc.). The system code 108 is instrumented with static and/or dynamic coverage points that correspond to coverage points in the expected coverage point data 103.

The expected coverage point data 103 is a vector of coverage point data which reflects the coverage points instrumented in the system code 108. If the coverage point in the system code 108 is expected to be exercised, the corresponding bit in the expected coverage point data 103 is set to "1", or "true". Otherwise, the corresponding bit in the expected coverage point data 103 is set to "0", or "false." Although bits are used as a reference example herein, counters may be used to represent coverage points in the expected coverage point data 103 (and the actual coverage point data 104). A coverage point in the system code 108 (and/or the associated expected coverage point data 103) may be of any level of granularity. For example, a first coverage point may be associated with one or more lines of system code 108, while a second coverage point may be associated with a function of the system code 108. More generally and without limitation, coverage points may be associated with statements, procedures, methods, classes, files (object or source), packages, code paths, conditions, code branches, directories, libraries, programs, processes, replicas, process trees, and/or applications. Furthermore, coverage points may be associated with entries in the system logs 107 corresponding to some system function. The coverage point data 103 is exposed to the test manager 102 to facilitate the testing and fault tolerance strategies disclosed herein.

The actual coverage point data 104 is a vector reflecting whether a given code coverage point in the expected coverage point data 103 has been exercised by one or more compute nodes $101_{1-N}$. For example, in an online shopping platform, one or more code coverage points in the expected coverage point data 103 may be associated with a set of lines of the system code 108 that enable a user to view and click a "purchase" button that allows the user to purchase one or more items. Therefore, in such an example, one or more bits of the actual coverage point data 104 reflect whether the system code 108 that supports the purchase button has been executed.

The coverage point data 103, actual coverage point data 104, and lines of source code (or system code 108) are used as non-limiting reference examples herein. The disclosure is equally applicable to reflect any number and type of instrumentation schemes with varying costs and properties.

The action code 105 is representative of executable code for a plurality of different actions performed by a computing system. The plurality of executable actions are representative of any type action that can be performed on one or more of the compute nodes $101_{1-N}$. The actions include, without limitation, shutting down one or more compute nodes $101_{1-N}$, halting one or more processes executing on the compute nodes $101_{1-N}$, starting one or more processes, modifying routing tables, performing configuration tasks, and the like. The executable code for such actions include, without limitation, workloads and/or faults that can be injected into the compute nodes $101_{1-N}$. In at least one embodiment, the actions in the action code 105 are parameterized. For example, to restart node $101_2$, the test manager 102 may invoke an example command "restart(node$101_2$)" corresponding to code in the action code 105. Once invoked, an indication of the command (and any subsequent system operations) may be stored in a system log 107, which stores indication of events occurring in the compute nodes $101_{1-N}$.

The effect code 106 is representative of a plurality of executable scripts (or finite state machines), each of which is associated with one or more of the actions in the action code 105. Each script in the effect code 106 is programmed with explicit expectations that allow a given script to determine when the consequences of the associated action from the action code 105 appear in the system logs 107. For example, continuing with the "restart(node$101_2$)" action from the action code 105, the effect code 106 is programmed to monitor the system log 107 on node $101_2$ to determine if an entry corresponding to a shutdown event has been generated within a specified amount of time. The effect code 106 also determines whether other predefined (or expected) log entries associated with the action appear in the system log 107 (such as a power on entry after the shutdown entry, entries for any other events during the boot sequence of the restarted node, etc.). More generally, the scripts in the effect code 106 ultimately reach an "accept" or "reject" final state, reflecting whether the invoked action from the action code 105 has successfully or unsuccessfully completed, respectively. For example, if the script of the effect code 106 identifies each expected log entry in the system log 107, the script of the effect code 106 may reach an accept (or accepting) final state. Similarly, if the script of the effect code 106 does not identify each expected log entry in the system log 107, the script of the effect code 106 may reach a reject final state. In some embodiments, the script of the effect code 106 and/or the test manager 102 stores an indication of the final state of the script (e.g., accept, reject) in the test result data 111.

The associations 109 store associations between the actions in the action code 105 and a corresponding script in the effect code 106. The associations 109 further store associations between an action in the action code 105 and one or more code coverage points in the expected coverage point data 103 (and/or actual coverage point data 104). Furthermore, in at least one embodiment, the associations 109 may associate a given coverage point in the expected coverage point data 103 with a unique triple, where the triple includes the code coverage point, an action from the action code 105, and a script from the effect code 106. Doing so allows the test manager 102 to determine when the associated units of source code in the system code 108 have been naturally invoked (e.g., by applications executing on the compute nodes 101$_{1-N}$), and skip injection of a workload and/or fault from the action code 105 known to invoke the associated units of source code in the system code 108. Such selective testing allows the test manager 102 to minimize the expense of testing the system code 108.

To test the system code 108, the test manager 102 initially resets the actual coverage point data 104 by setting each vector bit to a zero value. Doing so has the effect of conveying that none of the expected coverage points 103 of the system code 108 have been exercised in a given compute node 101$_N$ (or system-wide across all compute nodes 101$_{1-N}$). In one embodiment, the test manager 102 then constructs a queue of triples, where each triple corresponds to an action from the action code 105, a corresponding script from the effect code 106, and a coverage point from the expected coverage point data 103. Therefore, the queue includes an indication of each code coverage point that is uniquely identified by a corresponding triple.

The test manager 102 then iterates through each entry of the queue in order. For a given queue entry, the test manager 102 receives the actual coverage point data 104 corresponding to the coverage point for the current queue entry. The actual coverage point data 104 corresponds to a given time index (e.g., a time t=1), and reflects whether the associated system code 108 has been exercised since the actual coverage point data 104 was reset. The test manager 102 then performs a bitwise AND operation on the actual coverage point data 104 and the expected coverage point data 103 for the current queue entry. For example, assuming 8 bits of actual coverage point data 104 and 8 bits of expected coverage point data 103 exist for the current entry in the queue, the test manager 102 may perform a bitwise AND operation on the respective sets of 8 bits. Although a bitwise AND comparison operation is used as a reference example herein, any type of comparison operation to compare expected and actual coverage point data is contemplated by the disclosure.

If the result of the bitwise AND equals the corresponding bits of the expected coverage point data 103, the test manager 102 determines that the associated system code 108 has been exercised naturally, and skips instantiation of the action from the action code 105 for the current queue entry, as there is little to no additional value of re-executing the associated code during the current time interval. Similarly, the test manager 102 skips instantiation of the script from the effect code 106 for the current entry. However, in some embodiments, the test manager 102 instantiates the action from the action code 105 and/or the script from the effect code 106 based on one or more predefined parameters (e.g., instantiate every N iterations through the queue, execute each script from the effect code 106 at all times, etc.). Furthermore, in some embodiments, rather than skipping the action code 105 and/or the effect code 106, the test manager 102 moves the current entry to the end of the queue.

However, if the bitwise AND of the bits of the expected coverage point data 103 and the bits of the actual coverage point data 104 for the current queue entry does not equal the corresponding bits of the expected coverage point data 103, the test manager 102 determines that the associated system code 108 has not been exercised (naturally or by the test manager 102). As such, the test manager 102 instantiates the action from the action code 105 (e.g. a workload and/or a fault) and the associated script from the effect code 106.

While the action from the action code 105 and the script from the effect code 106 execute, events from the system logs 107 are presented to the action from the action code 105 and/or the script from the effect code 106 for processing. Once the script from the effect code 106 completes processing, the script may be in one of a plurality of accept states, or one of a plurality of reject states. If the script is in an accept state, the test manager 102 stores an indication in the test result data 110 specifying that the corresponding action from the action code 105 (and/or the corresponding system code 108) executed correctly. However, if the script is in a reject state, the test manager 102 stores an indication in the test result data 110 specifying that the corresponding action from the action code 105 (and/or the corresponding system code 108) did not execute correctly (e.g., experienced an error or other type of problem). Doing so reflects that an error or some other unexpected result occurred, and allows system administrators to isolate and fix the error.

The test manager 102 then receives the actual coverage point data 104 for the current queue entry at a second time index (e.g., time t=2). The test manager 102 then performs a bitwise AND of the actual coverage point data 104 for the second time index and the expected coverage point data 103 for the current queue entry. If the result of the bitwise AND equals the expected coverage point data 103 for the current queue entry, the test manager 102 stores an indication in the test result data 110 specifying that the action from the action code 105 executed the corresponding code from the system code 108. If the result of the bitwise AND does not equal the expected coverage point data 103 for the current queue entry, the test manager 102 stores an indication in the test result data 110 specifying that the action from the action code 105 did not execute the corresponding code from the system code 108.

Figure 2:
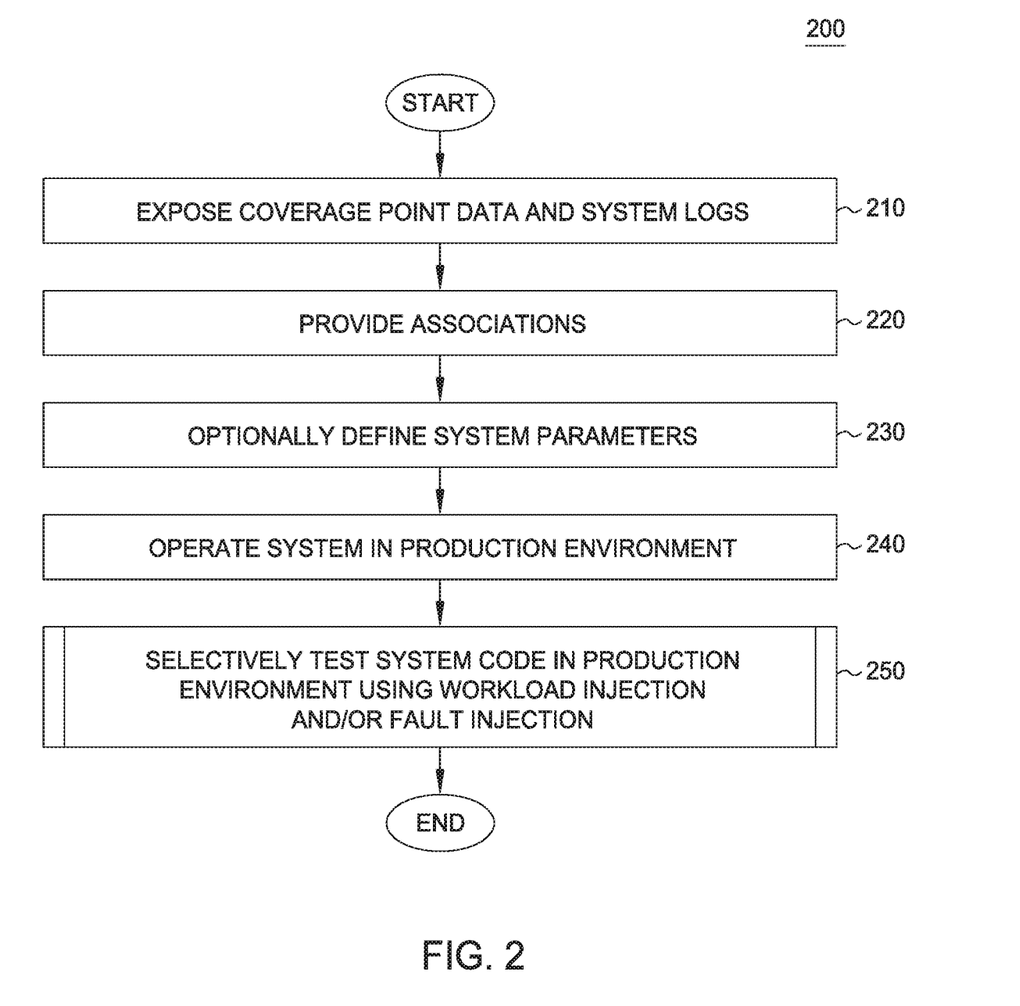
FIG. 2 is a flow chart illustrating a method to provide introspective fault and workload injection for service assurance, according to one embodiment.

FIG. 2 is a flow chart illustrating a method 200 to provide introspective fault and workload injection for service assurance, according to one embodiment. As shown, the method 200 begins at block 210, where the expected coverage point data 103, actual coverage point data 104, and system logs 107 are exposed to the test manager 102 on the compute nodes 101$_{1-N}$. At block 220, the associations 109 are provided to the test manager 102. As previously stated, the associations 109 include associations between actions in the action code 105 and one or more coverage points in the expected coverage point data 103 (and/or actual coverage point data 104). The associations 109 further include associations between an action in the action code 105 and a script in the effect code 106. At block 230, a user may optionally define parameters for operating the test manager 102. For example, the user may specify to always execute the scripts from the effect code 106 regardless of whether the corresponding action from the action code 105 has been invoked. The optional parameters may further include time intervals and maximum time thresholds for executing an action from the action code 105 and/or a script from the effect code 106. Furthermore, the user may specify to suspend the test manager 102 upon determining one or more of the compute nodes 101$_{1-N}$ are currently processing a fault. Other parameters include, without limitation, randomizing the queue after each complete processing of the queue by the test manager 102, splitting the queue into buckets, where each bucket runs on different intervals, processing the queue in parallel using a multiple execution threads for the test manager 102.

At block 240, the compute nodes 101$_{1-N}$ execute at least a portion of the system code 108 in a production environment. At block 250, the test manager 102 selectively tests the system code 108 using workload injection and/or fault injection. Generally, in doing so, the test manager 102 injects faults and/or workloads known to test portions of the system code 108 only if those portions of the system code 108 have not been recently executed. However, the test manager 102 generally refrains from testing portions of the system code 108 that have been naturally executed. For example, if a user specifies to restart a first process on a compute node $101_N$, the test manager 102 refrains from re-testing the code to restart the first process, as doing so would provide little to no additional value. In doing so, the test manager 102 ensures that all of the system code 108 is tested at all times.

Figure 3:
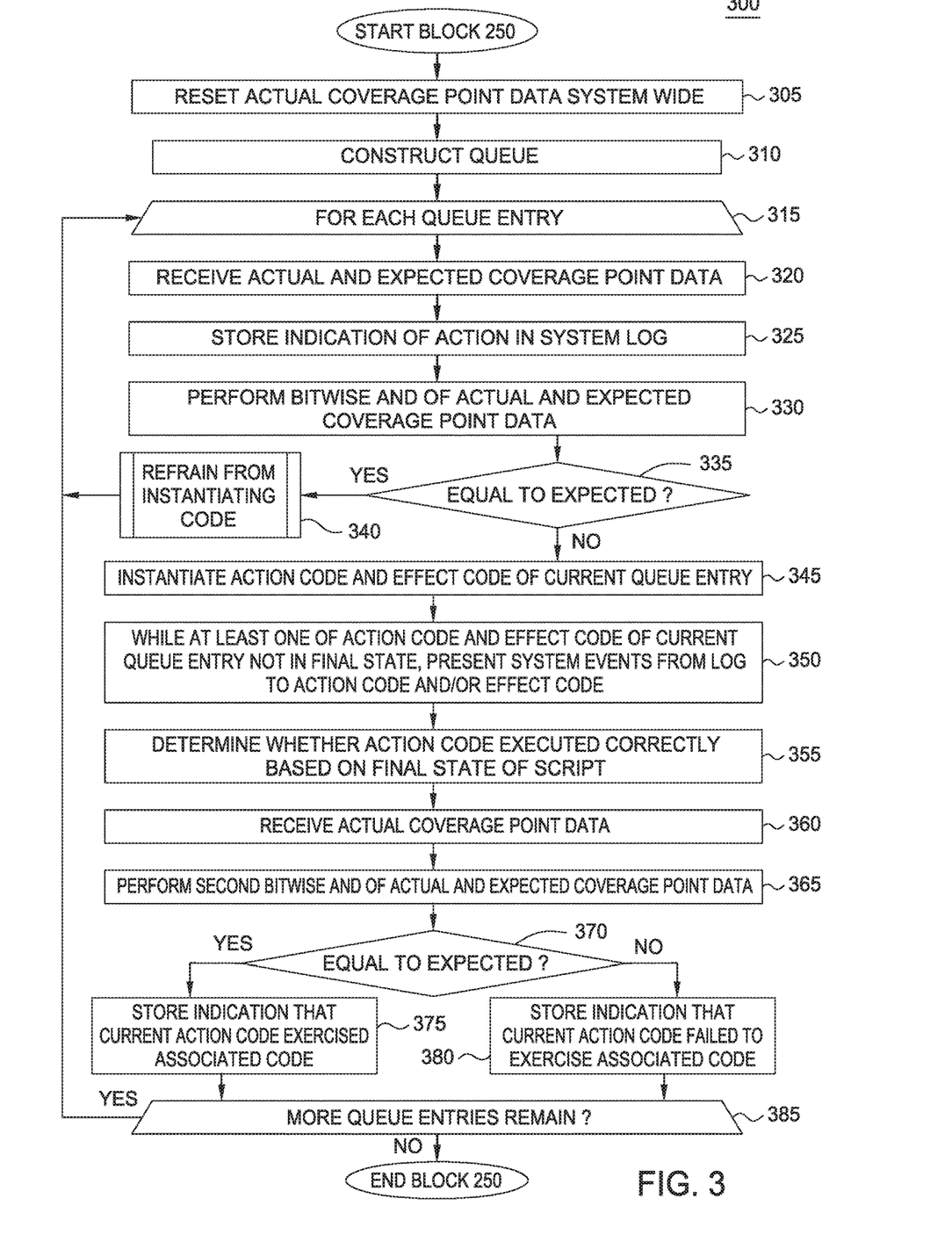
FIG. 3 is a flow chart illustrating a method to selectively test system components in a production environment using workload and/or fault injection, according to one embodiment.

FIG. 3 is a flow chart illustrating a method 300 corresponding to block 250 to selectively test system components in a production environment using workload and/or fault injection, according to one embodiment. As shown, the method 300 begins at block 305, where the test manager 102 resets the actual coverage point data 104 on each compute node $101_{1-N}$. At block 310, the test manager 102 constructs a queue of triples, where each triple is a unique combination of an action from the action code 104, a script from the effect code 105, and a code coverage point from the expected coverage point data 103. At block 315, the test manager 102 executes a loop including blocks 320-385 for each entry in the queue. At block 315, the test manager 102 receives the expected coverage point data 103 and the actual coverage point data 104 for the current queue entry from one or more of the compute nodes $101_{1-N}$. The actual coverage point data 104 may be associated with a first time interval. At block 325, the test manager 102 stores, in the system log 107, an indication of the action from the action code 105 for the current queue entry.

At block 330, the test manager 102 performs a bitwise AND on the expected coverage point data 103 and the actual coverage point data 104 for the current queue entry received at block 320. At block 335, the test manager 102 determines whether a result of the bitwise AND operation performed at block 330 equals the expected coverage point data 103 for the current queue entry. For example, if 4-bit vectors having values of "1010" and "0101" are received for the expected coverage point data 103 and the actual coverage point data 104, respectively, the test manager 102 determines whether the result of the bitwise AND operation equals "1010". If the result of the bitwise AND equals the expected coverage point data 103, the test manager 102 proceeds to block 340, described in greater detail with reference to FIG. 4. Generally, at block 340, the test manager 102 refrains from instantiating the current action code 105 and/or effect code 106, and returns to block 315. Doing so conserves system resources and does not degrade the performance of the compute nodes $101_{1-N}$. However, in some embodiments, the test manager 102 optionally executes the current action code 105 and/or effect code 106 based on system settings.

Returning to block 335, if the result of the bitwise AND does not equal the expected coverage point data 103, the test manager 102 proceeds to block 345, where the test manager 102 instantiates the action from the action code 105 and the script from the effect code 106 associated with the current queue entry. For example, if the current action is specifies to "crash-replica(node$101_1$, applicationX), the test manager 102 would invoke the workload and/or fault that crashes an example "applicationX" on compute node $101_1$. Similarly, the associated script from the effect code 106 would execute to determine whether the events associated with crashing an application replica appear in the system logs 107 of compute node $101_1$. At block 350, the test manager 102 presents events from the system logs 107 to the action from the action code 105 and/or the script from the effect code 106 instantiated at block 345 continue executing.

At block 355, the test manager 102 determines whether the action code 105 (and/or the associated system code 108) executed correctly based on the final state of the script from the effect code 106. Generally, if the final state of the script from the effect code 106 is an "accepting" state, the test manager 102 determines that the action code 105 (and/or the associated system code 108) executed correctly. However, if the final state of the script from the effect code 106 is a "fail" or "non-accepting" state, the test manager 102 determines that the action code 105 (and/or the associated system code 108) did not execute correctly.

At block 360, the test manager 102 receives actual coverage point data 104 corresponding to a second time interval, subsequent to the first time interval, for the current queue entry. At block 365, the test manager 102 performs a bitwise AND on the expected coverage point data 103 received at block 320 and the actual coverage point data 104 received at block 360. At block 370, the test manager 102 determines whether a result of the bitwise AND operation performed at block 365 equals the expected coverage point data 103 received at block 320 for the current queue entry. If the result of the bitwise AND performed at block 365 equals the expected coverage point data 103, the test manager 102 proceeds to block 375, where the test manager 102 stores an indication in the test result data 111 specifying that the current action code 105 exercised the associated system code 108 as defined by the expected coverage point data 103 for the current queue entry. However, if the result of the bitwise AND performed at block 365 does not equal the expected coverage point data 103, the test manager 102 proceeds to block 380. At block 380, the test manager 102 stores an indication in the test result data 111 specifying that the current action code 105 did not exercise the associated system code 108 as defined by the expected coverage point data 103 for the current queue entry. At block 385, the test manager 102 determines whether more entries in the queue remain. If more entries remain, the test manager 102 returns to block 315. Otherwise, the method 300 ends. However, in some embodiments, the test manager 102 returns to block 305 to continue to test the system code 108 during another interval.

Figure 4:
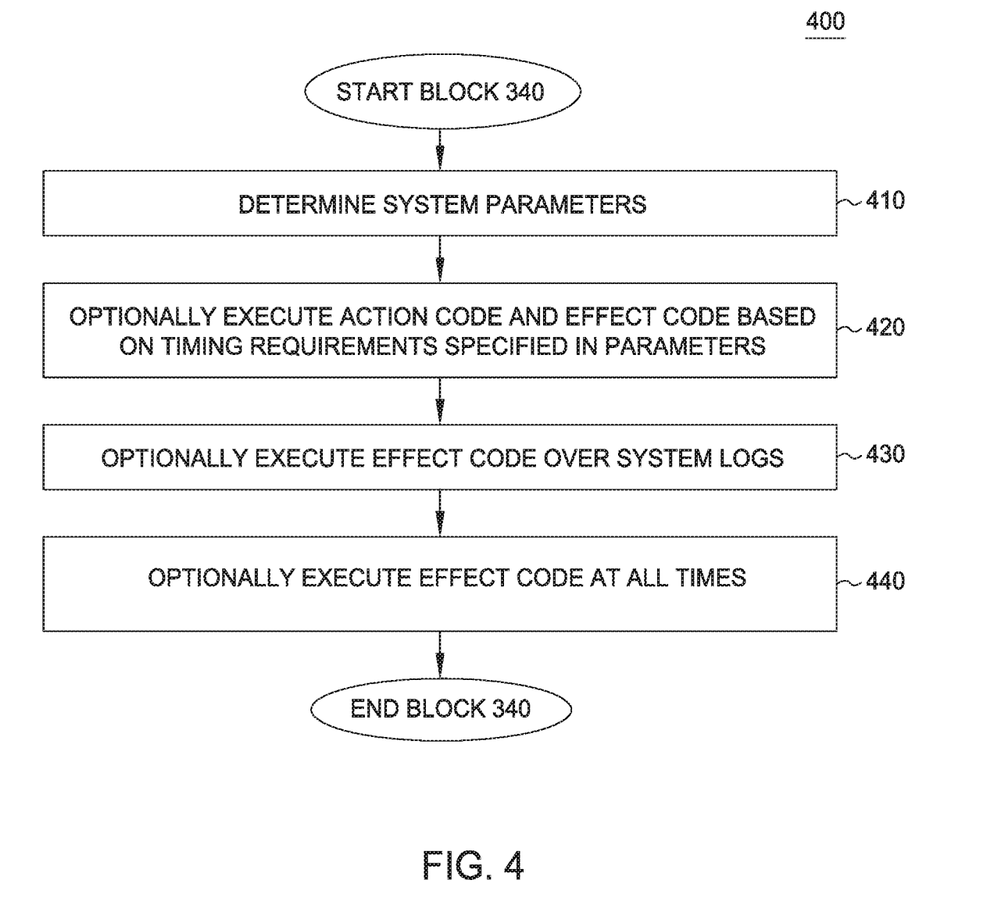
FIG. 4 is a flow chart illustrating a method to refrain from instantiating code, according to one embodiment.

FIG. 4 is a flow chart illustrating a method 400 corresponding to block 340 to refrain from instantiating code, according to one embodiment. As previously stated, the test manager 102 generally refrains from testing system code 108 that has been executed during "natural" processing by a given compute node $101_{1-N}$. However in some embodiments, system parameters may specify some cases where the system is configured to execute the action from the action code 105 and/or the script from the effect code 106. However, if none of the conditions specified in the system parameters are met, the test manager 102 refrains from executing the action from the action code 105 and/or the script from the effect code 106. As shown, the method 400 begins at block 410, where the test manager 102 determines the relevant system parameters for optionally instantiating the action from the action code 105 and/or the script from the effect code 106.

At block 420, the test manager 102 optionally executes the action from the action code 105 and the script from the effect code 106 upon determining timing requirements determined at block 410 are satisfied. For example, a system administrator may specify to execute the action from the action code 105 and the script from the effect code 106 every 10 times the queue is generated and processed. If such conditions are met, the test manager 102 instantiates the action from the action code 105 and the script from the effect code 106. At block 430, the test manager 102 executes the script from the effect code 106 based on a system parameter specifying to always run the script over the system logs 107. However, in such embodiments, the test manager 102 may refrain from executing the action from the action code 105.

At block 440 the test manager 102 optionally executes the script from the effect code 106 at all times. In such embodiments, a plurality of scripts (including more than one instance of a given script) from the effect code 106 may execute concurrently. Therefore, the test manager 102 may determine whether to invoke additional instances of a given script from the effect code. For example, the test manager 102 may detect a first execution instance of a script from the effect code 106, and determine to let the first execution instance of the first script from the effect code 106 to time out before injecting a second execution of the script along with corresponding action code 105. However, in other embodiments, the test manager 102 may invoke the second execution instance of the script from the effect code and the corresponding action code 106 while the first execution instance of the first script from the effect code 106 continues to execute. In such embodiments, the test manager 102 may consider the progress of the first execution instance of the first script from the effect code 106 when determining whether to inject a second execution instance. In some embodiments, in a counter-based implementation of the actual coverage point data 104 and expected coverage point data 103, the test manager 102 may consider the progress of the actual coverage point data 104 of the action code 105 of the first execution instance of the first script. For example, the actual coverage point data 104 may range from example values "0-20" for the action code 105 of the first script. If a first reading of the actual coverage point data 104 indicates an example value of 5, and a second reading indicates an example value of 7, the test manager 102 may inject another instance of the action code 105 the second execution instance of the first script, as the first execution instance may not be progressing appropriately.

Figure 5:
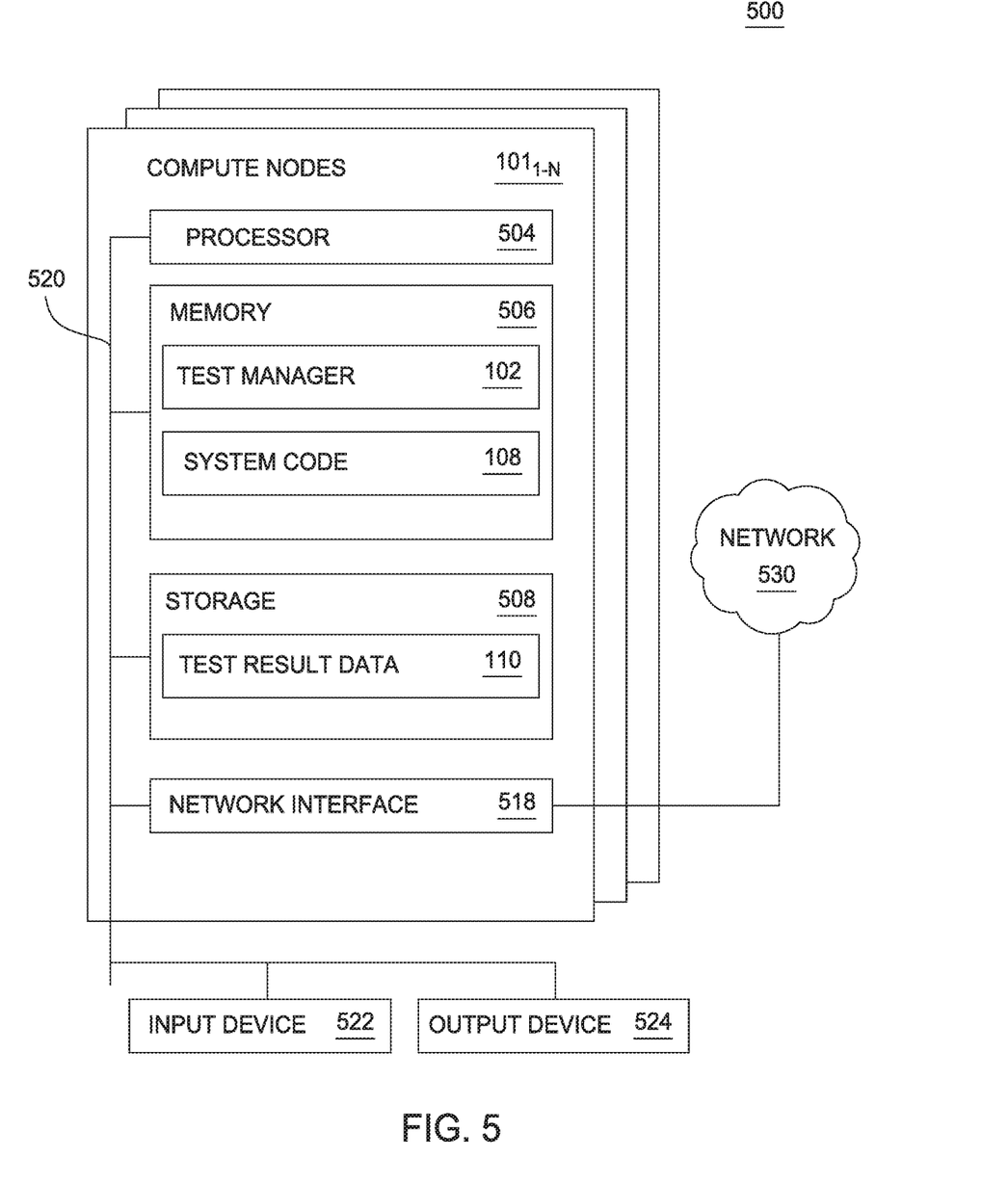
FIG. 5 is a block diagram illustrating a system which provides introspective fault and workload injection for service assurance, according to one embodiment.

FIG. 5 is a block diagram illustrating a system which provides introspective fault and workload injection for service assurance, according to one embodiment. The networked system 500 includes the compute nodes $101_{1-N}$. Each compute node $101_{1-N}$ may also be connected to other computers and/or compute nodes $101_{1-N}$ via a network 530. In general, the network 530 may be a telecommunications network and/or a wide area network (WAN). In a particular embodiment, the network 530 is the Internet.

Each compute node $101_{1-N}$ generally includes a processor 504 which obtains instructions and data via a bus 520 from a memory 506 and/or a storage 508. Each compute node $101_{1-N}$ also includes one or more network interface devices 518, input devices 522, and output devices 524 connected to the bus 520. Each compute node $101_{1-N}$ is generally under the control of an operating system (not shown). Any operating system supporting the functions disclosed herein may be used. The processor 504 is a programmable logic device that performs instruction, logic, and mathematical processing, and may be representative of one or more CPUs. The network interface device 518 may be any type of network communications device allowing the compute nodes $101_{1-N}$ to communicate with other computers via the network 530.

The storage 508 is representative of hard-disk drives, solid state drives, flash memory devices, optical media and the like. Generally, the storage 508 stores application programs and data for use by the compute nodes $101_{1-N}$. In addition, the memory 506 and the storage 508 may be considered to include memory physically located elsewhere; for example, on another computer coupled to the computer 502 via the bus 520.

The input device 522 may be any device for providing input to the compute node $101_{1-N}$. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the test manager 102 and the system code 108. As shown, the storage 508 contains the test result data 110. The memory 506 and/or the storage 508 may further include the expected coverage point data 103, actual coverage point data 104, action code 105, effect code 106, system logs 107, and associations 109, each not pictured for the sake of clarity. Generally, the system 500 is configured to implement all functionality and methods described above with reference to FIGS. 1-4.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method, comprising:
    determining, based on actual coverage point data for a first time interval and expected coverage point data, that a first set of lines of source code associated with the actual and expected coverage point data has not been executed by a system, wherein the expected coverage point data indicates (i) a first coverage point corresponding to the source code expected to be executed by the system and (ii) a second coverage point corresponding to the source code that is not expected to be executed, while the actual coverage point data indicates whether the first and second coverage points have been executed by the system;
    instantiating, in the system, an action code associated with the first set of lines of source code and an effect code associated with the action code; and
    determining, based on a final state of the effect code, whether the action code executed correctly in the system.

2. The method of claim 1, wherein determining that the first set of lines of source code has not been executed comprises:
    receiving the actual coverage point data associated with the first set of lines of source code for the first time interval;
    receiving the expected coverage point data associated with the first set of lines of source code;
    performing a comparison operation on the actual coverage point data associated with the first set of lines of source code for the first time interval and the expected coverage point data associated with the first set of lines of source code; and
    determining that a result of the comparison operation is not equal to the expected coverage point data.

3. The method of claim 1, wherein determining whether the action code executed correctly in the system comprises:
    determining, based on the final state of the effect code being in an accepting final state, that the action code executed correctly in the system.

4. The method of claim 1, wherein determining whether the action code executed correctly in the system comprises:
   determining, based on the final state of the effect code being in a rejecting final state, that the action code did not execute correctly in the system.

5. The method of claim 1, wherein the instantiating comprises:
   storing, in a first entry of a system log, an indication that the action code has been instantiated; and
   processing, by at least one of the action code and the effect code, at least a second entry in the system log, wherein the second entry is subsequent to the first entry.

6. The method of claim 1, further comprising:
   receiving actual coverage point data associated with the first set of lines of source code for a second time interval;
   performing a comparison operation on the actual coverage point data associated with the first set of lines of source code for the second time interval and the expected coverage point data associated with the first set of lines of source code;
   determining that a result of the comparison operation is equal to the expected coverage point data associated with the first set of lines of source code;
   determining that the first set of lines of source code has been naturally executed on the system between the first and second time intervals; and
   refraining from instantiating the action code in the system.

7. The method of claim 1, wherein the action code comprises one or more of: (i) a fault and (ii) a workload, wherein the effect code comprises a script, wherein the actual coverage point data reflects whether the first set of lines of source code has been executed during the first time interval of a plurality of time intervals.

8. A system, comprising:
   a processor; and
   a memory containing a program which when executed by the processor performs an operation comprising:
      determining, based on actual coverage point data for a first time interval and expected coverage point data, that a first set of lines of source code associated with the actual and expected coverage point data has not been executed by the system, wherein the expected coverage point data indicates (i) a first coverage point corresponding to the source code expected to be executed by the system and (ii) a second coverage point corresponding to the source code that is not expected to be executed, while the actual coverage point data indicates whether the first and second coverage points have been executed by the system;
      instantiating, in the system, an action code associated with the first set of lines of source code and an effect code associated with the action code; and
      determining, based on a final state of the effect code, whether the action code executed correctly in the system.

9. The system of claim 8, wherein determining that the first set of lines of source code has not been executed comprises:
   receiving the actual coverage point data associated with the first set of lines of source code for the first time interval;
   receiving the expected coverage point data associated with the first set of lines of source code;
   performing a comparison operation on the actual coverage point data associated with the first set of lines of source code for the first time interval and the expected coverage point data associated with the first set of lines of source code; and
   determining that a result of the comparison operation is not equal to the expected coverage point data.

10. The system of claim 8, wherein determining whether the action code executed correctly in the system comprises:
    determining, based on the final state of the effect code being in an accepting final state, that the action code executed correctly in the system.

11. The system of claim 8, wherein determining whether the action code executed correctly in the system comprises:
    determining, based on the final state of the effect code being in a rejecting final state, that the action code did not execute correctly in the system.

12. The system of claim 8, wherein the instantiating comprises:
    storing, in a first entry of a system log, an indication that the action code has been instantiated; and
    processing, by at least one of the action code and the effect code, at least a second entry in the system log, wherein the second entry is subsequent to the first entry.

13. The system of claim 8, the operation further comprising:
    receiving actual coverage point data associated with the first set of lines of source code for a second time interval;
    performing a comparison operation on the actual coverage point data associated with the first set of lines of source code for the second time interval and the expected coverage point data associated with the first set of lines of source code;
    determining that a result of the comparison operation is equal to the expected coverage point data associated with the first set of lines of source code;
    determining that the first set of lines of source code has been naturally executed on the system between the first and second time intervals; and
    refraining from instantiating the action code in the system.

14. The system of claim 8, wherein the action code comprises one or more of: (i) a fault and (ii) a workload, wherein the effect code comprises a script, wherein the actual coverage point data reflects whether the first set of lines of source code has been executed during the first time interval of a plurality of time intervals.

15. A non-transitory computer-readable storage medium having computer-readable program code embodied therewith, the computer-readable program code executable by a processor to perform an operation comprising:
    determining, based on actual coverage point data for a first time interval and expected coverage point data, that a first set of lines of source code associated with the actual and expected coverage point data has not been executed by a system, wherein the expected coverage point data indicates (i) a first coverage point corresponding to the source code expected to be executed by the system and (ii) a second coverage point corresponding to the source code that is not expected to be executed, while the actual coverage point data indicates whether the first and second coverage points have been executed by the system;
    instantiating, in the system, an action code associated with the first set of lines of source code and an effect code associated with the action code; and determining, based on a final state of the effect code, whether the action code executed correctly in the system.

16. The computer-readable storage medium of claim 15, wherein determining that the first set of lines of source code has not been executed comprises:
receiving the actual coverage point data associated with the first set of lines of source code for the first time interval;
receiving the expected coverage point data associated with the first set of lines of source code;
performing a comparison operation on the actual coverage point data associated with the first set of lines of source code for the first time interval and the expected coverage point data associated with the first set of lines of source code; and
determining that a result of the comparison operation is not equal to the expected coverage point data.

17. The computer-readable storage medium of claim 15, wherein determining whether the action code executed correctly in the system comprises:
determining, based on the final state of the effect code being in an accepting final state, that the action code executed correctly in the system.

18. The computer-readable storage medium of claim 15, wherein determining whether the action code executed correctly in the system comprises:
determining, based on the final state of the effect code being in a rejecting final state, that the action code did not execute correctly in the system.

19. The computer-readable storage medium of claim 15, wherein the instantiating comprises:
storing, in a first entry of a system log, an indication that the action code has been instantiated; and
processing, by at least one of the action code and the effect code, at least a second entry in the system log, wherein the second entry is subsequent to the first entry.

20. The computer-readable storage medium of claim 19, wherein the action code comprises one or more of: (i) a fault and (ii) a workload, wherein the effect code comprises a script, wherein the actual coverage point data reflects whether the first set of lines of source code has been executed during the first time interval of a plurality of time intervals, the operation further comprising:
receiving actual coverage point data associated with the first set of lines of source code for a second time interval;
performing a comparison operation on the actual coverage point data associated with the first set of lines of source code for the second time interval and the expected coverage point data associated with the first set of lines of source code; determining that a result of the comparison operation is equal to the expected coverage point data associated with the first set of lines of source code;
determining that the first set of lines of source code has been naturally executed on the system between the first and second time intervals; and
refraining from instantiating the action code in the system.

* * * * *